Nov. 26, 1957 W. B. CONNELL 2,814,397
BUNDLING MACHINE
Filed Feb. 16, 1954 5 Sheets-Sheet 1
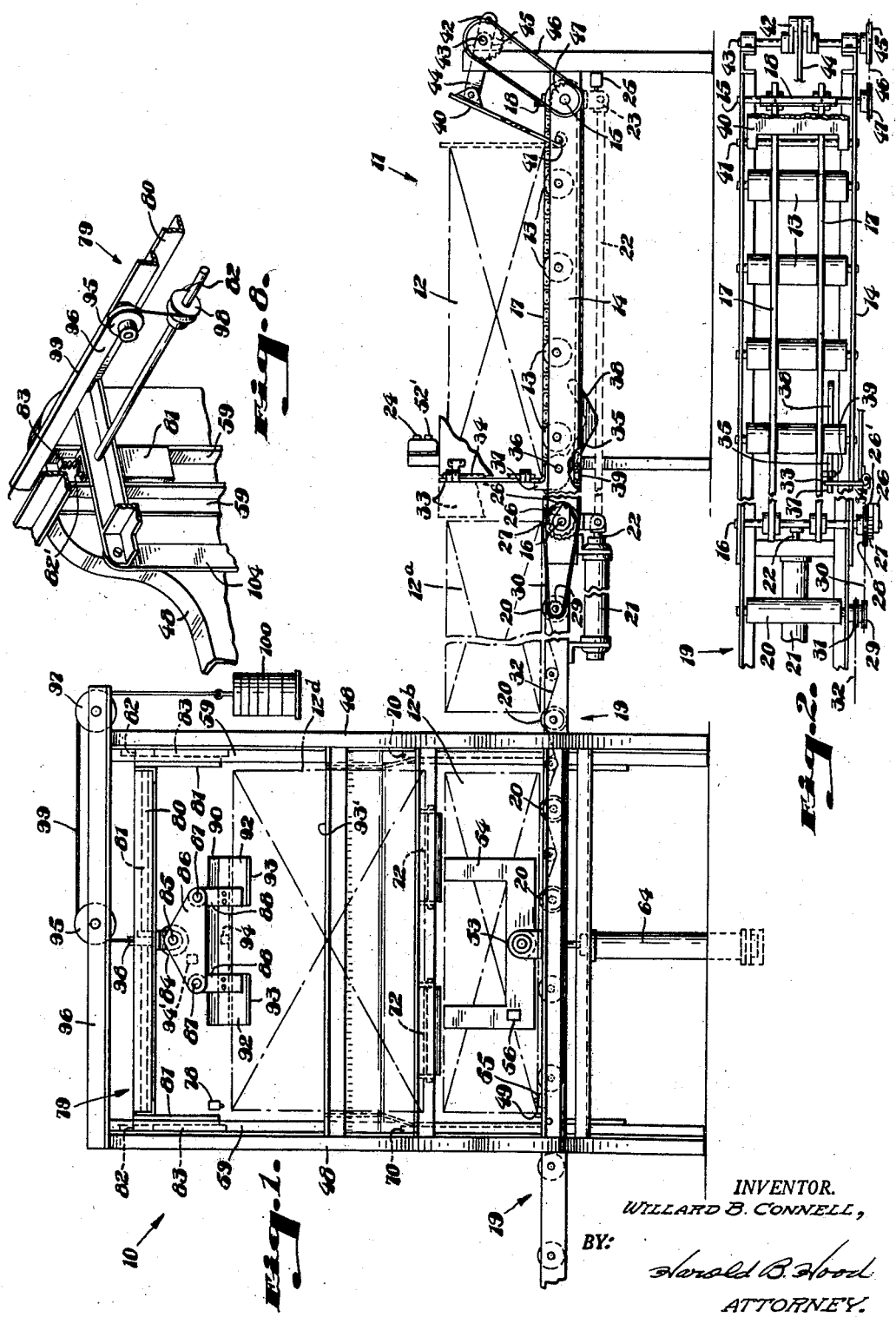
INVENTOR.
WILLARD B. CONNELL,
BY:
Harold B. Hood
ATTORNEY.

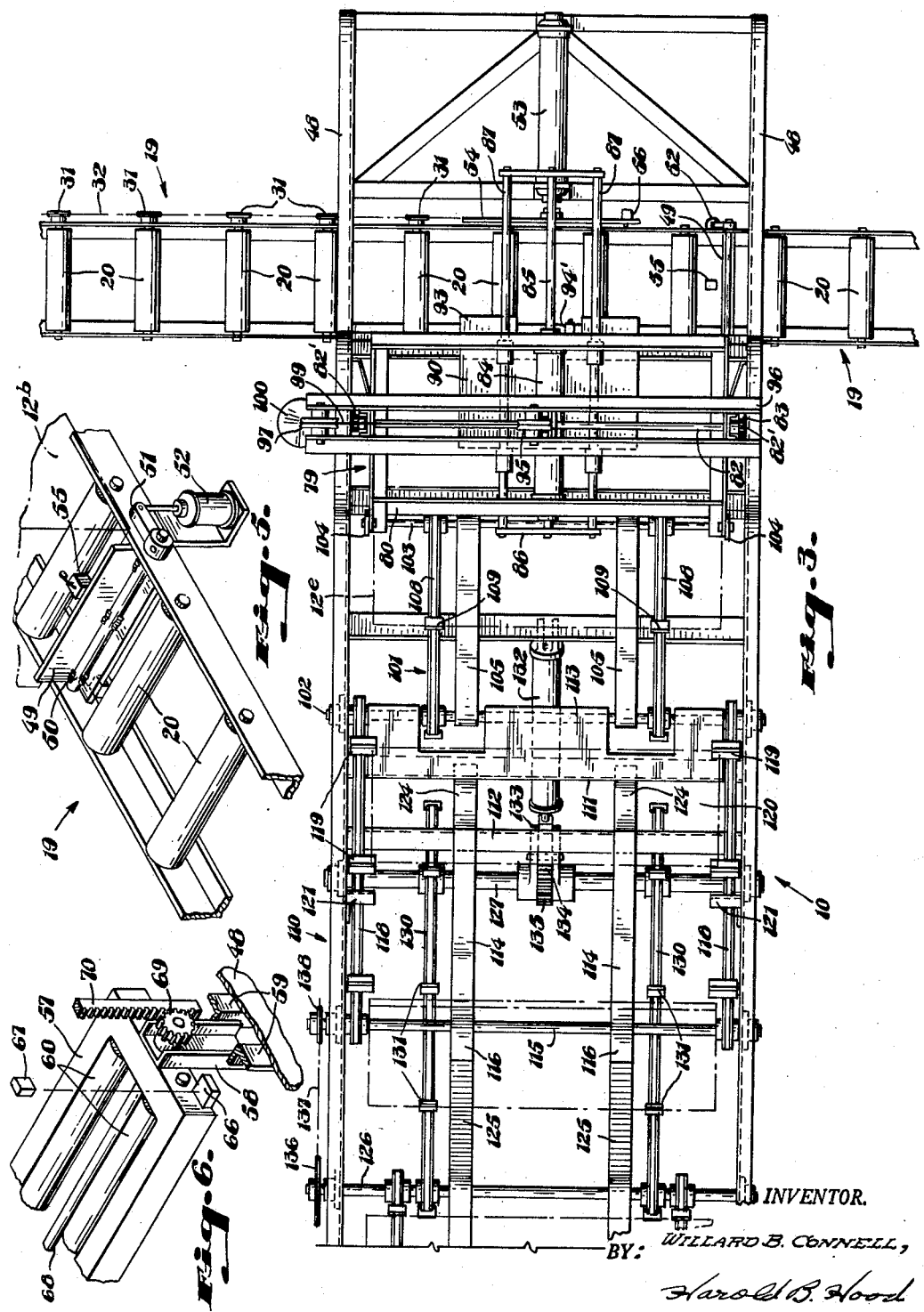

Nov. 26, 1957
W. B. CONNELL
2,814,397
BUNDLING MACHINE
Filed Feb. 16, 1954
5 Sheets-Sheet 3
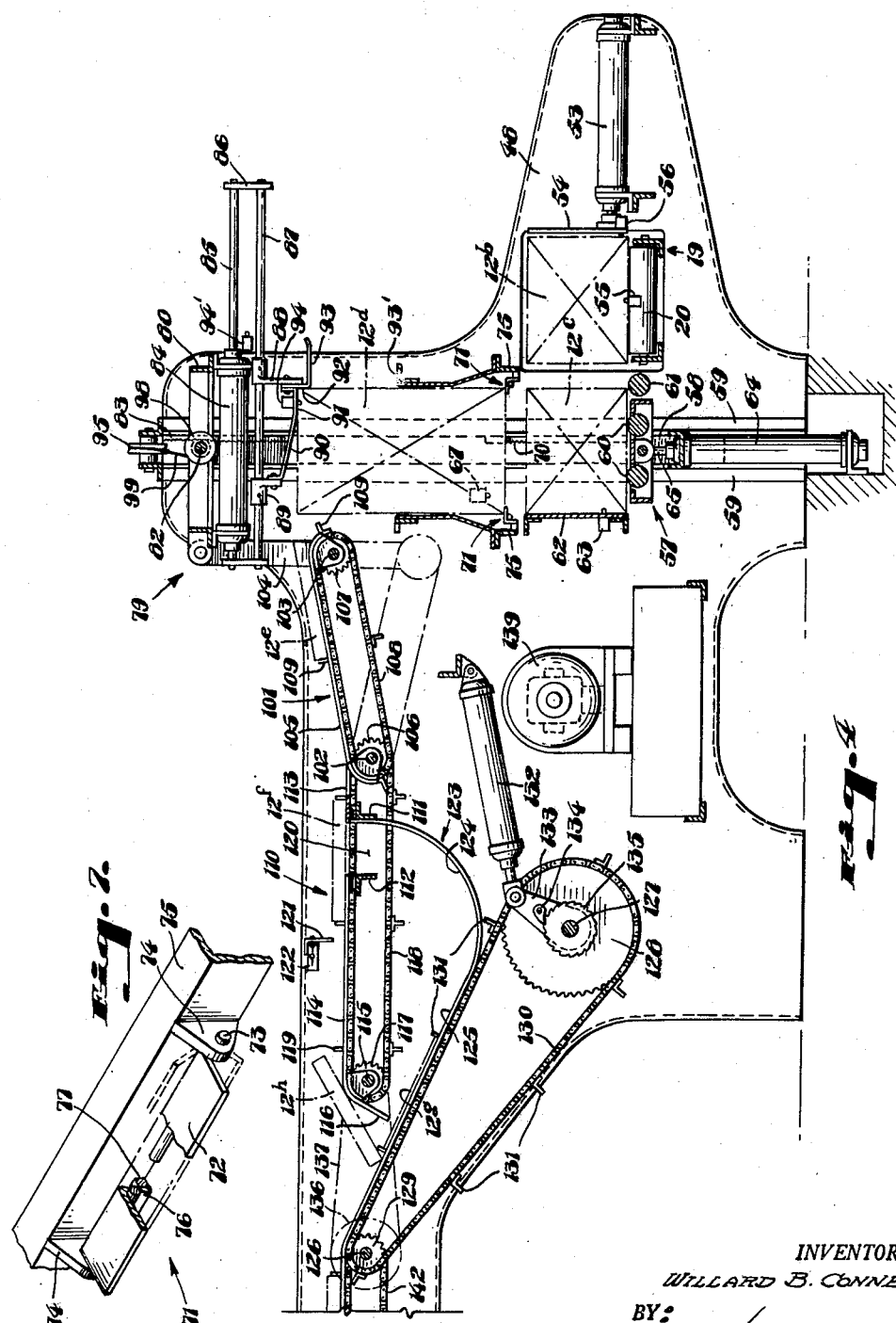
INVENTOR.
WILLARD B. CONNELL,
BY:
Harold B. Hood.
ATTORNEY.

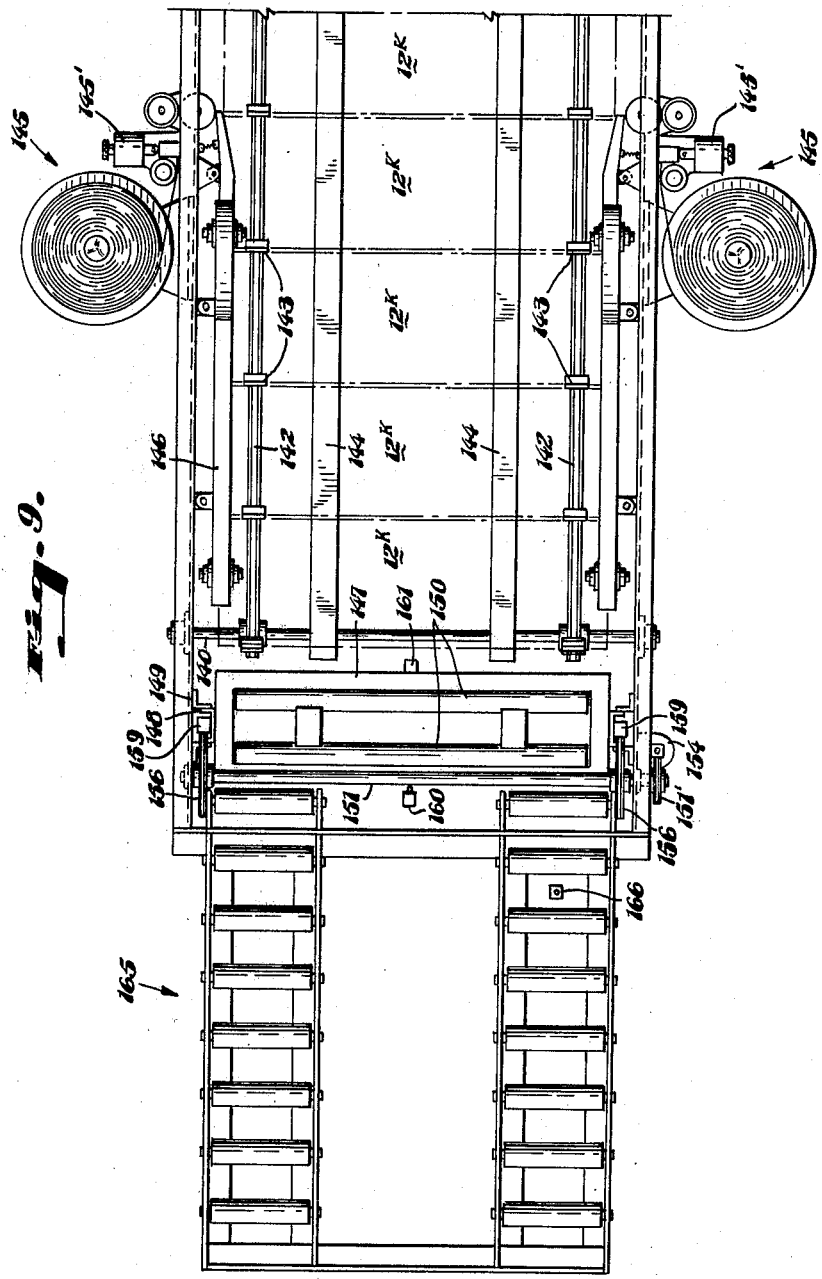

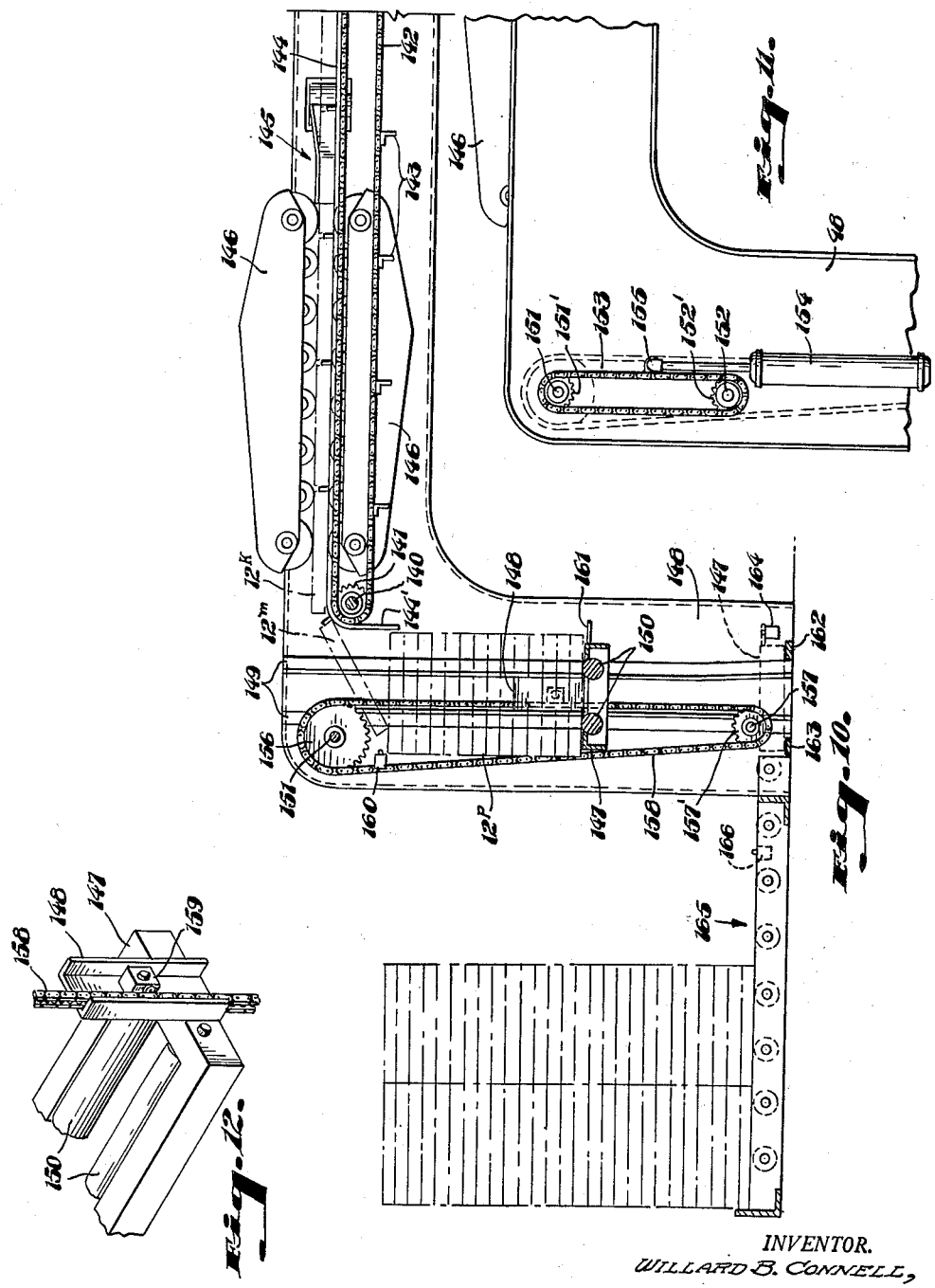

United States Patent Office 2,814,397
Patented Nov. 26, 1957

2,814,397

BUNDLING MACHINE

Willard B. Connell, Kansas City North, Mo., assignor to The J. B. Ehrsam & Sons Manufacturing Company, Enterprise, Kans., a corporation of Kansas Application February 16, 1954, Serial No. 410,594

4 Claims. (Cl. 214—6)

The present invention relates to a bundling machine and particularly to a machine for fastening together a stack of two or more sheet or board members of substantially uniform dimensions.

The machine is intended primarily for use in bundling together two or more sheets of plaster lath, or the like. Such a product is made, usually, with a finished side and an unfinished side, and it is desirable to invert the board on one side of the stack so that an unfinished side will be presented on both sides of a bundle to prevent damage to the finished sides during shipping.

The primary object of the invention is, therefore, to provide such a machine which will automatically arrange the required number of such board members into separate stacks, invert the uppermost board in the stack to present an unfinished board surface on both sides of the stack, and pass the stacks, thereafter, through mechanism for taping together the ends of the stack.

A further object is to provide such a machine having means for maintaining a stacked supply of such board members in the machine and means for automatically replenishing this stack as individual stacks are removed from the supply stack for bundling.

Another object is to provide such a machine including a hopper for receiving the board members preparatory to being transferred to the bundling mechanism of the machine, such hopper including means for evening the ends of the individual board members in the stack prior to such transfer.

Still another object is to provide a machine of the above type including means for receiving the bound bundles as they are discharged from the taping mechanism and for arranging such bundles in stacks at a point outside the machine proper.

Still further objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is an end view of the input end of my machine showing the hopper mechanism associated therewith;

Fig. 2 is a plan view of the hopper mechanism of Fig. 1;

Fig. 3 is a plan view of the input end of the machine;

Fig. 4 is a longitudinal sectional view through the input end of the machine;

Fig. 5 is a fragmentary perspective view, drawn to an enlarged scale, showing a portion of the conveyor means and associated mechanism for delivering a stack of board members to the bundling machine proper;

Fig. 6 is a fragmentary perspective view of a detail of the means for elevating a new supply of board members into position for passage through the bundling mechanism;

Fig. 7 is a fragmentary perspective view of one of the stack-supporting elements of the machine, drawn to an enlarged scale;

Fig. 8 is a fragmentary perspective view of a detail of the picker means for separating the board members into separate stacks of a predetermined number;

Fig. 9 is a plan view of the output end of the machine;

Fig. 10 is a longitudinal sectional view through the output end of the machine;

Fig. 11 is a fragmentary side elevation of the output end of the machine; and

Fig. 12 is a fragmentary perspective view, drawn to an enlarged scale, of an end of the elevator platform at the output end of the machine.

Referring more specifically to the drawings, and particularly to Fig. 1. I have shown the input end of my machine 10 having associated therewith hopper means referred to generally by the reference numeral 11 for receiving and accumulating therein a stack of board members and comprising a plurality of grooved rollers 13 journalled in a frame 14. A pair of axles 15 and 16 is journalled in said frame on opposite sides of said rollers for rotation upon substantially parallel axes. Each of said axles is provided with a pair of sprockets over which is trained a pair of endless chains 17, 17. A bar member 18 spans chains 17 and is fixed thereto at a point adjacent axle 15 to lie in a substantially vertical plane substantially parallel to axle 15.

A conveyor 19 is supported upon the end of frame 14 adjacent machine 10 and extends to and beyond the input end of said machine. Said conveyor comprises a plurality of spaced rollers 20 mounted for rotation upon substantially parallel axes substantially parallel to axles 15 and 16.

A fluid motor 21 is supported from frame 14 upon an axis substantially normal to the axles 15 and 16, and the piston rod 22 is drivingly connected through a bracket 23 to the lower runs of chains 17. Motor 21 is actuated by means of a manually operated switch 24 located in a position convenient to the operator, and upon said actuation, bracket 23 is moved from its solid line position adjacent axle 16 to its dotted line position adjacent axle 15. Switch means 25 is arranged near axle 15 for engagement by bracket 23 to reverse motor 21 when it reaches the end of its forward stroke. Such movement of motor 21 will shift the bar member 18 from its illustrated position toward machine 10 to engage a stack of board members 12, in hopper 11 and move said stack out of said hopper to the position illustrated at 12a. Upon the next actuation of motor 21, the stack of board members at 12a will be moved to the position illustrated at 12b in front of the input end of machine 10, and a further stack of board members 12 will be moved to the position 12a.

It is necessary that the rollers 20 in conveyor 19, between hopper 11 and the machine 10, be driven in order to move the stacks 12 toward the input end of machine 10. To this end, I provide a crank 26 fixed to axle 16 and carrying a rachet dog 26' engageable with a rachet wheel 27 free for rotation upon axle 16. A sprocket 28 is fixed to wheel 27 and the roller 20 nearest hopper 11 is provided with a mating sprocket 29 drivingly connected with sprocket 28 by means of a chain 30. Each of the rollers 20 between hopper 11 and the median plane of machine 10 is provided with a sprocket 31, and a chain 32 is trained about sprockets 31 to provide a driving connection between said rollers and the axle 16. Thus, upon actuation of motor 21, movement of bracket 23 to the right, as viewed in Fig. 1, will rotate axle 16 in a counter-clockwise direction driving rollers 20 to move a stack 12 to the left. Reverse movement of motor 21 will drive axle 16 in the opposite direction returning the bar member 18 to its illustrated position, but due to the provision of the rachet drive, no movement of rollers 20 will take place during such opposite movement of axle 16.

Near axle 16 I provide a first, substantially vertical end wall 33 hinged for swinging movement about one edge upon a substantially vertical axis 34. This end wall preferably extends just far enough from axis 34 to engage the edge of the stack 12. A latch member 35 is provided to restrain end wall 33 from moving out of its stack-engaging position but is operable to release said end wall for swinging movement about axis 34 out of the path of a stack 12 to permit said stack to be moved out of hopper 11. Latch member 35 comprises a lever pivoted for rocking movement about an axis 36 substantially parallel to axle 16 and provides a finger 37, on one end thereof, engageable with the lower edge of end wall 33. The opposite end of lever 35 extends downwardly below the lower run of chains 17 and is turned upwardly toward axle 15 to provide a foot 38. A lug 39 is fixed to the lower run of one of chains 17 and, upon initial movement of bracket 23 to the right as viewed in Fig. 1, lug 39 will engage the adjacent surface of lever 35 to rock said lever about its axis 36 swinging finger 37 out of retaining engagement with end wall 33. Reverse movement of bracket 23 will move lug 39 into engagement with the foot 38 to again swing the lever about its axis moving the finger 37 out of the path of the lower edge of end wall 33 to permit said edge to move again behind finger 37. End wall 33 is, of course, yieldingly urged toward latching engagement with finger 37.

A second end wall 40 is pivoted in frame 14 for swinging movement about the lower edge thereof upon an axis substantially parallel to axle 15 between a substantially vertical position and a rest position in which said end wall is inclined away from end wall 33. A crank member 42 is journalled on frame 14 for rotation about an axis 43 substantially parallel to axle 15. A pitman 44 drivingly connects crank member 42 with the upper end of end plate 40. Crank member 42 is provided with a sprocket 45 drivingly connected through a chain 46 with a sprocket 47 fixed on axle 15. Thus, upon actuation of motor 21, axle 15 will be rotated to drive crank member 42 to swing end plate 40 from its illustrated solid line position to its illustrated dotted line position. Since the individual board members comprising the stack 12 are usually deposited in the hopper 11 in an uneven arrangement, movement of end wall 40 to its vertical position will move the ends of the individual board members in stack 12 against end wall 33 to be blocked thereby and relatively shifted into substantially vertical alignment.

The timing between the movement of end wall 40, lug 39, and the bar member 18 is such that, upon initial movement of motor 21, the end plate 40 will be moved to its vertical position and the lug 39 will have moved finger 37 out of engagement with end wall 33 substantially at the moment when the bar member 18 is moved into engagement with the adjacent end of stack 12. Continued movement of motor 21 will then push the stack 12 out of hopper 11 into the position 12a. The stroke of motor 21 is sufficient to move stack 12 far enough from end wall 33 to permit the end wall to clear the trailing edge of the stack and return to its illustrated blocking position. Switch 24 is, of course, closed to actuate motor 21 only when a sufficient number of board members have been deposited in hopper 11 to build the stack 12 to a predetermined height.

When a stack 12 is moved from its position at 12a to its position at 12b in front of the input end of machine 10 it will strike a stop plate 49 to arrest its movement at a point in which it is correctly arranged for subsequent movement into machine 10. It is sometimes desirable, however, to permit a stack 12 to be moved past the input end of machine 10 and for this reason, I prefer to provide the mechanism, illustrated most clearly in Fig. 5, for moving the stop plate 49 out of its illustrated vertical position, in which it extends somewhat above the upper plane of rollers 20, to a position in which it lies beneath said plane. Plate 49 is fixed to an axle 50 journalled for rotation in the frame of conveyor 19 and a crank 51 is fixed to said axle and operably connected to motor means such as the solenoid 52. Solenoid 52 is energized by means of a manually operated switch 52' mounted adjacent switch 24 (see Fig. 1). Thus, when it is desirable that a stack of board members 12 be moved past the input end of machine 10, the operator merely closes switch 52' moving plate 49 out of the path of said stack and the stack can be moved on down the conveyor 19.

Machine 10 is built upon a frame comprising side members 48, 48 and, as can be seen in Fig. 4, the conveyor 19 extends through suitable openings in these side members. Upon suitable cross members carried by side members 48, on the side of conveyor 19 remote from the output end of machine 10, I provide a further fluid motor 53 mounted upon an axis substantially normal to the line of conveyor 19. A pusher plate 54 is fixed to the piston rod of motor 53 for reciprocatory movement between its illustrated position in Fig. 4 to a position on the opposite side of conveyor 19. Immediately ahead of stop plate 49, I provide a switch 55 for energization of motor 53. As a stack 12 approaches engagement with plate 49, it will close switch 55 actuating motor 53 and pusher plate 54 will engage said stack to move it laterally off conveyor 19 to the left, as viewed in Fig. 4. Preferably, a switch 56 is carried by plate 54 to provide a holding circuit for the motor 53 after stack 12 has been moved past switch 55.

Immediately adjacent conveyor 19, on the side thereof remote from motor 53, I provide a platform 57 provided with shoe members 58 fixed to the opposite ends thereof (see Fig. 6). Machine side frame members 48 are each provided with opposed vertically arranged track members 59, 59 for cooperative reception of shoes 58. Platform 57 is thereby guided for substantially vertical reciprocation in said track members.

Platform 57, preferably, is provided with a plurality of anti-friction roller means 60 journalled between the ends thereof to which the shoe members 58 are fixed. A similar roller 61 is journalled in the frame members 48 between conveyor 19 and platform 57 to facilitate movement of a stack 12 from its illustrated position at 12b (see Fig. 4) to its illustrated position at 12c upon platform 57.

A back plate 62 is supported in machine frame 48 on the side of platform 57 remote from conveyor 19 and in turn supports a switch 63 against which the stack 12 engages when moved into its position 12c on the platform 57. Closure of switch 63 reverses movement of motor 53 to return pusher plate 54 to its illustrated position. Such closure of said switch likewise energizes a fluid motor 64 having its piston rod 65 operatively connected to platform 57 and, upon such energization of said motor, platform 57 will be moved upwardly carrying with it the stack 12 supported thereon. The platform 57 continues upward movement until a finger 66, or the like, carried by said platform comes in contact with a reversing switch 67. Action of motor 64 is thereby reversed and platform 57 is returned to its illustrated position.

In order to maintain the opposite ends of platform 57 in a substantially common, horizontal plane, I provide a shaft 68 journalled for rotation in platform 57 upon an axis substantially parallel to rollers 60. A pinion 69 is fixed to each end of shaft 68 for meshing engagement with vertically extending racks 70 carried by the opposite frame members 48. Should either end of the platform 57 tend to drop below the opposite end thereof, it will be prevented from doing so since pinions 69 are always in meshing engagement with racks 70 throughout vertical movement of platform 57.

As platform 57 reaches its uppermost position and its movement is reversed, I provide stack-supporting means, referred to generally by the reference numeral 71, for engagement with the under side of the stack 12 to arrest downward movement of said stack and to support the stack while the platform continues to move toward its lowermost position. Such stack-supporting means each comprises a normally horizontal gate member 72 (see Fig. 7) pivoted for swinging movement about an axle 73 supported from suitable brackets 74 in turn supported from frame cross members 75 carried by the machine side frames 48. Each such gate member is provided with a depending flange 76 along its edge remote from the stack 12 for engagement with a block 77 fixed to the frame cross member 75. There are, of course, one or more of such stack-supporting means provided on each side of the stack 12 and, it will be seen, that as the stack is raised from its position 12c toward its position at 12d, the upper surface of said stack will engage the inwardly extending gate members 72 and swing them about their axes 73 out of the path of the moving stack. The stroke of motor 64 is such that the stack will be raised until its lower surface clears the gate member 72 permitting said members to return to their horizontal position, either under the influence of gravity or under the influence of spring means (not shown). As platform 57 then moves down, the lower surface of the stack at 12d will come to rest on the upper side of the gate member 72 and, as platform 57 again moves up to elevate a further stack, the previously elevated stack will be raised until it comes in contact with a switch 78 (see Fig. 1) to arrest upward movement of said platform. Platform 57 will then remain stationary until a sufficient number of board members are removed from the upper end of stack 12d to open switch 78. Thereafter, the platform will continue to rise until switch 67 is closed to reverse movement of motor 64.

Mounted for vertical reciprocation in the track members 59 I provide a carriage, referred to generally by the reference numeral 79, above the platform 57. Said carriage comprises a perimetral frame 80 provided with shoe members 81, at opposite ends thereof, for cooperative reception between track members 59, 59 (see Figs. 4 and 8). Here again, to maintain the opposite ends of frame 80 in a common, substantially horizontal plane, I provide a shaft 82 journalled in said frame between said opposite ends. Said shaft carries a pinion 82' on each end thereof for meshing engagement with racks 83 fixed to the machine frame 48.

A double-action fluid motor 84 is supported from carriage 79 for reciprocation of its oppositely extending piston rod 85 in a line substantially normal to the axis of shaft 82. A pair of plates 86, 86 are fixed on opposite ends of piston rod 85 and support a pair of spaced rods 87, 87 in turn supporting opposed pairs of bracket members 88 and 89. A plate 90 is fixed between brackets 88 and 89 and has a substantially horizontal portion 91 engageable with the upper surface of stack 12d. A substantially vertical plate 92 is fixed to bracket 88 and extends below the horizontal portion 91 of plate 90 a predetermined distance. Preferably, plate 92 is provided with a horizontal portion 93 along its lower edge thereof (see Fig. 4). Plate 92 is so supported from bracket 88 that the distance of the horizontal portion 93 from the plane of the horizontal portion 91, of plate 90, can be varied for a purpose soon to become apparent. Plate 90 supports a switch 94 controlling actuation of motor 84. Upon movement by motor 84 of the brackets 88 and 89 to their illustrated position in Fig. 4, the horizontal portion 93 of plate 92 will drop over the right-hand edge of stack 12d and the entire carriage 79 will be lowered until the horizontal portion 91 of plate 90 comes to rest on the upper surface of said stack. Such lowering of carriage 79 will close switch 94 actuating motor 84 to shift plate 92 to the left, as viewed in Fig. 4, to push a predetermined number of the uppermost board members in stack 12d to the left as a separate stack 12e. The distance of plate portion 93 below plate portion 91 will, of course, determine the number of such board members that will be moved to the position indicated at 12e. This number can be varied by adjustment of plate portion 93 relative to plate portion 91.

In order that the entire weight of the carriage 79 will not be supported upon stack 12d, I prefer to provide counter-balance means for said carriage. Such means comprises a pulley member 95 journalled upon suitable cross members 96 spanning the machine side frames 48 above carriage 79. A second such pulley member 97 is supported on said cross members on the outboard side of one of said side frame members. A drum 98 is fixed to shaft 82 and a cable 99 is wrapped about said drum, led up over pulley 95, around pulley 97 and fixed to a weight 100 suspended by said cable. The cable 99 is wrapped about drum 98 in a direction such that the pinions 82' will tend to climb up racks 83. The weight 100 can be controlled so that only a slight amount of pressure is exerted by carriage 79 against stack 12d.

As plate 92 is moved to the left, as viewed in Fig. 4, the separate stack 12e is moved onto a conveyor indicated generally by the reference numeral 101. Upon reaching the limit of its stroke toward the left, motor 84 will be reversed upon contact by plate 86 with a switch 94'. The horizontal plate portion 93 will then slide across the upper surface of stack 12d until the vertical plate portion 92 drops over the right hand edge of the stack again closing switch 94 to cause motor 84 to move plate 92 in the opposite direction. This motion of motor 84 will continue so long as stack 12d is of a sufficient height and, with each stroke of motor 84, carriage 79 will descend an amount equal to the height of the stacks 12e until the horizontal plate portion 93 comes to rest against a stop 93' supported in the machine frame 48 (see Fig. 4).

Conveyor 101 comprises a pair of spaced axles 102 and 103. Axle 102 is journalled between side frame members 48 for rotation about an axis substantially normal to the axis of motor 84. Axle 103 is supported at its opposite ends upon linking members 104 carried by the carriage 79. A pair of rail members 105, 105 is supported between axles 102 and 103 upon suitable bearings. Thus it will be seen, that the end of conveyor 101 adjacent stack 12d is maintained always at a slight distance below the top of stack 12d, moving up and down in response to movement of carriage 79.

Axle 102 is provided with a pair of spaced sprockets 106 and axle 103 is provided with a pair of similarly spaced sprockets 107. A pair of endless chains 108, 108 is trained over the sprocket pairs 106 and 107, the upper runs of said chains lying substantially in the plane of the rail members 105. Each chain 108 is provided with a plurality of lugs 109 spaced apart a distance substantially equal to the width of the board members in the stack 12e. Upon movement of the stack 12e onto the rail members 105, the stack is picked up by the lugs 109 and moved along the rails 105 as the chains 108 are driven by motor means later to be described.

A substantially horizontal bed 110 is arranged at the output end of conveyor 101. Said bed comprises a pair of cross members 111 and 112 supported between the frame members 48, 48 and spaced apart slightly in the direction of movement of conveyor 101 to provide a slot 120 traversing bed 110. A plate 113 is supported on cross member 111 and spans the gap between said member and the adjacent end of conveyor 101. A pair of rail members 114, 114 have one end thereof supported on cross member 112 and their opposite end supported on suitable bearings carried by an axle 115 journalled in the machine side frames 48 upon an axis substantially parallel to axle 102. The forward ends 116 of said rail members are turned down, as illustrated in Fig. 4, for a purpose later to become apparent.

Axle 115 is provided with a pair of spaced sprockets 117 and axle 102 is provided with a pair of similarly spaced sprockets. A pair of endless chains 118, 118, is trained about said sprockets with the upper runs thereof lying substantially in the plane of rail members 114. Each chain 118 is provided with a plurality of lugs 119 spaced apart a distance substantially equal to the spacing of lugs 109 on chains 108. As a stack 12e is moved along by conveyor 101 it passes across plate 113 and is picked up by lugs 119 on chains 118 and moved along over slot 120 to a position indicated at 12f (see Fig. 4).

Immediately ahead of slot 120, I provide a pair of wiper means, supported on the opposite frame members 48, each comprising a depending finger 121 supported from a suitable bracket 122. The lower end of each such finger is arranged in the path of the uppermost board member in stack 12f so that, as stack 12f is moved along conveyor 110, the uppermost board member will engage fingers 121 and be arrested thereby while said stack 12f continues to be moved toward the opposite edge of bed 110. Said upper board member will thereby be caused to tip over the trailing edge of stack 12f and to fall edgewise through the slot 120.

Arranged beneath bed 110 is a concaved ramp, referred to generally by the reference numeral 123, comprising a pair of spaced rail members each having an upwardly curved rear portion 124 arranged to receive the falling board from slot 120. The ramp is further provided with an inclined portion 125 extending upwardly from the concaved portion 124 beneath the end of bed 110 and terminating substantially in the plane of rail members 114.

An axle 126 is journalled between machine side frames 48, 48 substantially in the plane of axles 102 and 115 for rotation about an axis substantially parallel to said axles. An axle 127 is journalled in said machine frame below the concave ramp portion 124. Said axle is provided with a pair of spaced sprockets 128 and axle 126 is provided with a mating pair of sprockets 129. Endless chains 130 are trained about said sprocket pairs with the upper run of said chains lying substantially in the plane of the inclined ramp portion 125. Chains 130 are each provided with a plurality of lug members 131 spaced apart a distance substantially equal to the spacing of lug members 119 and, as the board member falls through slot 120, what was the upper side of said board member engages the concaved ramp portion 124 and, as the board member slides down to the lowermost part of said ramp portion, said board member is picked up by the lug members 131 and moved up the inclined ramp portion 125 beneath the down turned ends 116 of rail members 114.

Chains 130 are driven by a fluid motor 132 fixed at one end to a suitable cross member carried in machine frame 48 and connected to a crank arm 133 journalled on axle 127. Crank 133 carries a rachet dog 134 engageable with a rachet wheel 135 fixed to said axle. Motor 132 is connected to reciprocate continuously until stopped by means later to be described. A fluid pump 139 may be supported in machine 10 to provide a continuous supply of fluid under pressure for the several fluid motors of the machine. Alternatively, an external source of fluid under pressure can be used.

Axle 126 is provided with a sprocket 136 on one end thereof and is connected through a chain 137 with a sprocket 138 fixed on axle 115. The timing between the chains 130 and the chains 114 is such that the fallen board 12g will be moved up the inclined ramp portion 125 at a rate such that it will pass beneath the end of bed 110 at the moment the stack 12h falls over the end of said bed. Stack 12h is prevented from sliding down the inclined ramp portion 125 by the provision of the down turned ends 116 of rail members 114. Thus, the stack 12h will fall onto the board 12g and be moved up the inclined ramp portion 125 with said board. Assuming that the finished sides of all of the board members in the stack 12h were facing downward, the inverting of the board 12g and the placing of said board on the bottom of the stack 12h will now result in the unfinished side of a board member being exposed on both the upper and lower surfaces of the stack 12h. All that remains to do now to finish the bundling operation is to tape together, or otherwise secure together, the board members of each stack 12h.

To this end I provide a further axle 140 (see Fig. 9) journalled in the machine frame 48, substantially in the plane of axles 126, 115 and 102, for rotation about an axis substantially parallel to the axes of said axles. A pair of sprockets 141 is fixed to axle 140 and a pair of chains 142 is trained about said sprockets and a mating pair of sprockets fixed to axle 126. Each of said chains is provided with a plurality of lug members 143 spaced apart a distance substantially equal to the spacing of lug members 131. A pair of rail members 144, which may constitute continuations of the rail members forming the ramp 123, is supported substantially in the plane of the upper runs of chains 142. The forward ends of said rail members are preferably turned down as shown in Fig. 10 for a purpose soon to become apparent.

A pair of tape-applying mechanisms 145 of more or less conventional construction, is provided on opposite sides of machine 10 and the tape is led through a perforating device 145′ prior to its engagement with the ends of bundles 12k being moved past said mechanisms. Tape is applied to the ends of said bundles as they are moved past mechanisms 145 and the bundles are then passed between upper and lower pressure heads 146, 146 for sealing the tape tightly against the upper and lower surfaces of said bundles. The tape is perforated at points such that the perforations will coincide with the line of division between successive stacks 12k receiving said tape.

At the forward end of the rail members 144, I provide a second platform 147 having shoe members 148 fixed to the opposite ends thereof and received between substantially vertical track members 149 fixed to the opposite machine side frames 48. Platform 147 is provided with a plurality of anti-friction roller means 150 (see Figs. 10 and 12) journalled for rotation about axes substantially parallel to axle 140 and projecting slightly above the upper surface of platform 147. Platform 147 is moved between an upper position slightly below the plane of rail members 144 and a lower position near the bottom of the machine side frames 48.

Just above the uppermost position assumed by platform 147 I provide an axle 151 journalled in the machine side frames 48, and a pair of stub shafts 157 are coaxially carried by the machine side frames 48 at a point near the bottom of said machine frames. Each of said stub shafts supports a sprocket 157′, and an endless chain is trained about each of said sprockets and a mating sprocket 156 fixed on axle 151. A further stub shaft 152 is carried on one of the machine side frames 48 at a point intermediate shafts 151 and 157 for rotation about an axis substantially parallel to said shafts (see Fig. 11). Shaft 152 supports a sprocket 152′ and a mating sprocket 151′ is fixed to axle 151. An endless chain 153 is trained about said sprockets. A fluid motor 154 has its piston rod fixed to one run of the chain 153 and, upon actuation of said motor in one direction, the axle 151 will be rotated in a counter-clockwise direction.

Each of the shoe members 148 is provided with a block 159 fixed to one run of one of the chains 158. Thus, upon rotation of shaft 151 in a counter-clockwise direction the platform 147 will be raised up the trackway 149 to its uppermost position. In this position it will receive a stack 12m falling over the forward end of the rail members 144. A switch 160 is mounted to be engaged by such stack and, upon the closure of said switch, the motor 154 will be actuated to lower the platform 147 a distance substantially equal to the thickness of the stack 12m. The platform 147 will continue to be lowered in such step-by-step movement until it reaches its lowermost position. In said position, the platform is adapted to come to rest against stop members 162 and 163 and, it will be noticed from an inspection of Fig. 10, stop member 162 is slightly higher than stop member 163. The platform 147 will, thereby, be caused to tip slightly in the direction away from the input end of machine 10. Platform 147 is further provided with a finger 161 engageable with a switch 164 when the platform reaches its lowermost position. Closure of said switch will cut off fluid from all the fluid motors heretofore mentioned in machine 10 to completely halt the operation of the machine until switch 164 is again opened.

Upon the tilting of platform 147 the stack 12p of bundled board members resting on platform 147 will roll off said platform under the influence of gravity and onto a gravity-type conveyor 165. As stack 12p leaves the platform 147 it will close a switch 166, in parallel with switch 164, releasing the machine for further operation and energizing motor 154 to raise platform 147 to its uppermost position.

It will be seen that by the use of this machine board members of substantially uniform length and width are arranged in neat stacks; automatically moved onto an elevator; and raised into a position for separation by a picker means into smaller stacks for bundling. The top board in such smaller stacks is then inverted and moved to the bottom of the stack to present an unfinished board surface on each side of the stack. Each such stack is then passed through a binder means, such as the tape-applying mechanism 145; delivered to an elevator where such bound stacks are deposited until a specified number are accumulated thereon; and thereafter removed and stored at a point near the output end of the machine. All of this is done without the need of manual operation of any form after the stack of board members are started through the machine. Thus, a completely automatic mechanism for doing a job heretofore performed almost entirely by hand is provided resulting in a much more uniform end product with a substantial saving in time and labor.

I claim as my invention:

1. In a machine for bundling a stack of two or more board members of substantially uniform dimensions, the combination of means for supporting a vertically-stacked supply of such board members, means providing a substantially horizontal bed spaced from said supply stack, carriage means arranged above said supply stack and guided for substantially vertical movement, endless conveyor means comprising a pair of spaced, substantially parallel axles, journal means for one of said axles supported adjacent the input end of said bed, link means carried by said carriage means and supporting the other of said axles for swinging movement of said conveyor means about said one axle in response to vertical movement of said carriage means, picker means supported from said carriage means and guided for reciprocation along a line substantially normal to said axles, said picker means comprising a substantially horizontal member adapted to rest upon the uppermost board in said supply stack, and a substantially vertical member depending from the edge of said horizontal member remote from said conveyor means and adapted to drop over the edge of said supply stack remote from said conveyor means, as said picker means is moved away from said conveyor means, and to push a predetermined number of the uppermost boards in said supply stack, as a separate stack, off said supply stack and onto said conveyor means as said picker means is moved toward said conveyor means, means for driving said conveyor means to move said separate stack onto said bed, and further conveyor means associated with said bed and adapted to receive said separate stack and move it across said bed toward the opposite edge thereof.

2. The combination of claim 1 in which said vertical member of said picker means is vertically adjustable to vary the number of board members which will be moved off said supply stack with each stroke of said picker means.

3. In a machine of the class described, means providing a surface for supporting a stack of board members of substantially uniform dimensions, a platform arranged adjacent one side of said surface-providing means and guided for reciprocation along a substantially vertical path, means for maintaining said platform in a substantially horizontal attitude, a pusher plate arranged on the opposite side of said surface-providing means and guided for reciprocation across said surface toward and away from said platform, motor means for so moving said pusher plate to move a stack of said board members off said surface and onto said platform, motor means for raising said platform to its uppermost position, stack-supporting means for receiving and holding said stack so raised by said platform comprising oppositely arranged gate elements each having a portion projecting beneath the edge of said stack and engageable by a further stack being raised by said platform to swing said portion out of the path of said stack to permit said stack to pass said gate elements, a carriage arranged above said stack of board members supported on said gate elements, substantially vertically extending track means fixed adjacent the opposite ends of said carriage, shoe means carried by said carriage and engaging said track means to guide said carriage for substantially vertical reciprocation, a shaft journalled on said carriage and projecting beyond said opposite carriage ends, a pinion fixed on each end of said shaft, a pair of vertically extending racks fixed adjacent said opposite carriage ends, said pinions meshing with said racks during vertical movement of said carriage, bracket means supported from said carriage and guided for reciprocatory movement along a line substantially at right angles to said shaft, motor means for so reciprocating said bracket means, said bracket means including a substantially horizontal portion and a substantially vertical portion, said vertical portion dropping over the edge of said stack of board members, as said bracket means is moved in one direction, with said horizontal portion coming to rest on the uppermost board in said stack, said vertical portion thereafter engaging a predetermined number of said uppermost boards in said stack to move said boards, as a separate stack, off said supported stack as said bracket is moved in the opposite direction, means arranged to receive said separate stacks as they are moved off said supported stack comprising endless conveyor means moving over spaced, substantially parallel axles, means supporting one of said axles at a position spaced from said supported stack, and link means carried by said carriage and supporting the other of said axles near said stack and slightly below said bracket means for swinging movement of said conveyor means about said one axle in response to vertical movement of said carriage.

4. In a machine of the class described, means providing a surface for supporting a stack of board members of substantially uniform dimensions, a platform arranged adjacent one side of said surface-providing means and guided for reciprocation along a substantially vertical path, means for maintaining said platform in a substantially horizontal attitude, a pusher plate arranged on the opposite side of said surface-providing means and guided for reciprocation across said surface toward and away from said platform, motor means for so moving said pusher plate to move a stack of said board members off said surface and onto said platform, motor means for raising said platform to its uppermost position, stack-supporting means for receiving and holding said stack so raised by said platform comprising oppositely arranged gate elements each having a portion projecting beneath the edge of said stack and engageable by a further stack being raised by said platform to swing said portion out of the path of said stack to permit said stack to pass said gate elements, a carriage arranged above said stack of board members supported on said gate elements, substantially vertically extending track means fixed adjacent the opposite ends of said carriage, shoe means carried by said carriage and engaging said track means to guide said carriage for substantially vertical reciprocation, a shaft journalled on said carriage and projecting beyond said opposite carriage ends, a pinion fixed on each end of said shaft, a pair of vertically extending racks fixed adjacent said opposite carriage ends, said pinions meshing with said racks during vertical movement of said carriage, bracket means supported from said carriage and guided for reciprocatory movement along a line substantially at right angles to said shaft, motor means for so reciprocating said bracket means, said bracket means including a substantially horizontal portion and a substantially vertical portion, said vertical portion dropping over the edge of said stack of board members, as said bracket means is moved in one direction, with said horizontal portion coming to rest on the uppermost board in said stack, said vertical portion thereafter engaging a predetermined number of said uppermost boards in said stack to move said boards, as a separate stack, off said supported stack as said bracket is moved in the opposite direction, counterbalance means for said carriage characterized by the application of a torque to said shaft in a direction tending to cause said pinions carried by said shaft to climb up said racks and attained by the provision of a drum fixed for rotation with said shaft, flexible strand means wrapped about said drum, guide means supported above said carriage, and a weight, said strand means being led up over said guide means and supportingly fixed to said weight.

References Cited in the file of this patent

UNITED STATES PATENTS

| | | |
|---|---|---|
| 409,571 | Fischer | Aug. 20, 1889 |
| 808,067 | Briggs | Dec. 26, 1905 |
| 1,444,206 | Penfield | Feb. 6, 1923 |
| 1,849,328 | Ingwersen et al. | Mar. 15, 1932 |
| 1,946,056 | Birdsey | Feb. 6, 1934 |
| 1,992,554 | Tavender | Feb. 26, 1935 |
| 2,269,827 | Mendoza | Jan. 13, 1942 |
| 2,501,970 | Sawitzke | Mar. 28, 1950 |
| 2,645,329 | Blair | July 14, 1953 |
| 2,648,181 | Dalton | Aug. 11, 1953 |
| 2,672,244 | Van Schie | Mar. 16, 1954 |
| 2,675,929 | Youngfelt | Apr. 20, 1954 |
| 2,675,930 | Youngfelt et al. | Apr. 20, 1954 |